No. 888,326. PATENTED MAY 19, 1908.
F. O. GUTH.
HOSE COUPLING.
APPLICATION FILED JUNE 28, 1907.
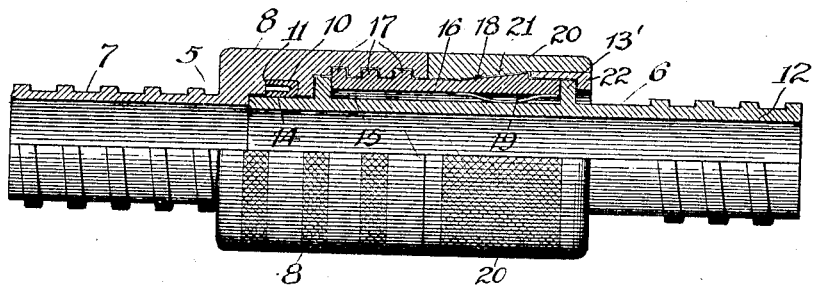
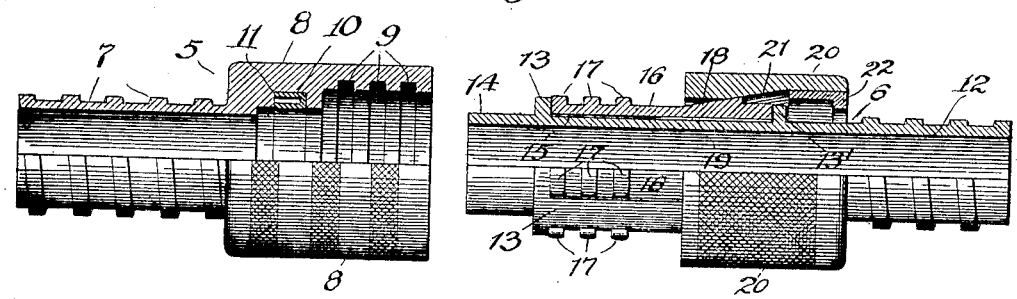
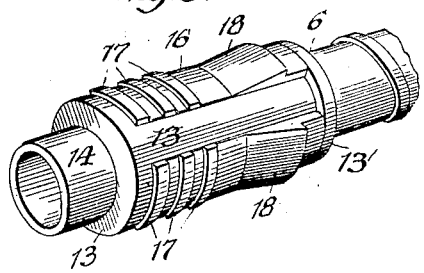
Witnesses
Inventor
Fred O. Guth

UNITED STATES PATENT OFFICE.

FRED O. GUTH, OF CHICAGO, ILLINOIS.

HOSE-COUPLING.

No. 888,326.

Specification of Letters Patent.

Patented May 19, 1908.

Application filed June 28, 1907. Serial No. 381,201.

*To all whom it may concern:*

Be it known that I, FRED O. GUTH, a citizen of the United States, residing at Chicago, in the county of Cook and State of Illinois, have invented certain new and useful Improvements in Hose-Couplings, of which the following is a specification.

My invention relates to improvements in hose couplings, and has among its salient objects to provide a quick acting hose coupling whereof the coacting parts may be coupled or uncoupled by simply pushing them together or pulling them apart longitudinally; and further to provide a coupling of the character described wherein the two coupling elements may swivel with respect to each other to permit relative rotation of adjoining sections of the hose.

Another object of my invention is to provide a construction of the character described which is simple, practical, neat in appearance, efficient and durable.

Other and further objects of my invention will become apparent to those skilled in the art from the following description taken in conjunction with the accompanying drawing, wherein:

Figure 1 is a part elevation, part section of a coupling embodying my invention; Fig. 2 is a similar view with the members uncoupled, and; Fig. 3 a perspective detail of the male coupling element with the controlling sleeve removed.

Throughout said views like numerals of reference refer always to like parts.

In the drawing 5 indicates in general the female element of the coupling and 6 the male element. The female element 5 comprises a body 7 of usual hose-receiving construction terminating in an enlarged head 8, having therein, near its open end, a plurality of parallel grooves 9, extending uninterruptedly around its inner surface and preferably providing further, in a portion of smaller diameter, beyond said grooves, a channel 10 in which is fitted a U-shaped packing ring 11, arranged with the open end of the U in the direction of the body 7. The male element 6 provides a similar body 12, such body connecting with an enlargement 13, flanged as at 13′ at its rear end, and at its front end terminating in a reduced stem portion 14 of size to interfit snugly within the packing ring 11. In the enlargement 13 are made longitudinally elongated recesses 15, of any suitable number, such as four, each such recess terminating between the ends of the enlargement, at the rear end in proximity to flange 13′. In said recesses are mounted radially-movable locking sections 16, each providing at what I may term its forward end a suitable series of projecting ribs 17 for engagement and interlocking with the grooves 9 of the female element, and each provided in rear of said ribs with a rearwardly ascending incline, or cam face, 18. Springs 19 are interposed between the bottoms of recesses 15 and the locking members 16 to normally press said members outward.

20 indicates in general the lock controlling sleeve or cap slidable longitudinally with respect to the locking members of the male element and arranged to move said members to unlocking position as it is slid rearwardly and to permit said members to move to locking position as it is slid forwardly. Specifically the controlling sleeve 20 comprises a generally cylindrical structure of exterior diameter equal to that of head 8, having its interior face flaring from front to rear, as indicated at 21, in conformity with the inclines 18, of the locking members. The front end of the sleeve is smaller than flange 13′ and its rear end is provided with a retaining part 22 suitably secured thereto and extending inward a sufficient distance to overlap the rear end of flange 13′, so that said sleeve is prevented from slipping out of place in either direction. The drawing shows the parts described of relative sizes and shapes which I have found to be practical.

When the coupling members are in locked position, as indicated in Fig. 1, the stem 14 and locking devices of the male element are inserted into the female element, the stem part 14 coacting with the annular packing ring 11, and the locking members 16 being forced out by their springs 19 so that the projections 17 engage in grooves 9 of the female element. Under these conditions the sleeve 20 stands at its forwardmost limit of movement so that its flaring portion 21 coincides with the cam portions 18 of the locking members, and the sleeve, closely abutting against the head 8 of the female element, forms a substantial continuation of the latter and entirely covers and protects the locking parts. It further will be noted that under these conditions the two hose sections may be rotated freely with respect to each other, the projections 17 turning freely in the continuous grooves 9.

When it is desired to uncouple the hose sections the sleeve 20 is pulled longitudinally away from the head 8 of the female element, and, in sliding over the locking members, inclined portion 21 presses the cam parts 18 of said locking members downward, so retracting the projections 17 into the grooves 15 and freeing the female parts from locking engagement so that the elements may be completely separated by a further direct pull. To again lock the parts together it is only necessary to reverse the action just described, connecting the two parts while the lock controller is drawn to rearmost position on the male element, and then moving it forward to free the locking parts for their automatic expansion under the influence of the springs 19.

It will be observed in respect to the construction heretofore described, that when in use the locking sleeve and head of the respective elements entirely cover and protect all of the working parts so as to exclude dirt and foreign substances therefrom, and so that the appliance will present an attractive appearance.

Furthermore, the parts are so constructed that when the controlling sleeve is in locking position, the cam parts of the locking sections exert no strain thereon tending to displace it, but rather tend to maintain it in locking position.

I have found that the packing heretofore adverted to is sufficient and that a coupling constructed in accordance with my invention is practical and advantageous in use.

Having thus described my invention, what I claim and desire to secure by Letters Patent, of the United States, is:

1. In a pipe coupling a female element having continuous internal grooves, a male element comprising a body part, radially movable spring-pressed locking sections for coaction with the grooves, and a lock-controlling sleeve movable longitudinally over said sections into contact with the female member to permit the interlock, and away from said female member to disengage the interlocking parts.

2. In a pipe coupling a female element having continuous internal grooves, a male element comprising a body part, an enlargement near its end, provided with longitudinal recesses, radially movable, spring-pressed locking sections seated in said recesses, and arranged for interlocking coaction with the groove, and a lock controlling sleeve of tapering interior diameter slidable upon said locking members to control their position, such sleeve being movable into contact with the female element in locking position, and out of contact therewith in unlocking position.

3. In a pipe coupling, a female element having an enlarged head of two interior diameters, provided with circumferential grooves in its part of greater diameter, and with a packing groove in its part of smaller diameter, a packing ring in said groove, and a male element comprising a reduced end-stem for coaction with said packing ring, an enlargement having therein recesses, ribbed locking members radially movable in said recesses, having inclined rear ends, springs for moving said members outwardly, and an interiorly tapering sleeve slidable longitudinally over the inclined ends of said members to move them inwardly.

4. In a coupling of the character described, a female element providing internal grooves, a male element, providing a part for insertion in said female element, spring-pressed locking members carried by said part having ribs for engaging the grooves of the female element and inclined portions in rear of said ribs, and a controlling sleeve arranged to depress said locking members to unlocking position when moved rearwardly and to permit their spring movement to locking position when moved forwardly, said sleeve when in locking position covering the said locking members and, with the female element, incasing them against introduction of dirt and the like.

In testimony whereof I hereunto set my hand in the presence of two witnesses.

FRED O. GUTH.

In the presence of—
  Geo. T. May, Jr.,
  Mary F. Allen.